INVENTOR.
GEORGE T. DOWNEY
BY
Diggins, O'Boyle, and Harmon
ATTORNEYS

Jan. 25, 1966  G. T. DOWNEY  3,231,182
CENTRIFUGAL FLUID PURIFIER AND FILTER
BYPASS INDICATOR COMBINATION
Filed June 28, 1963  2 Sheets-Sheet 2
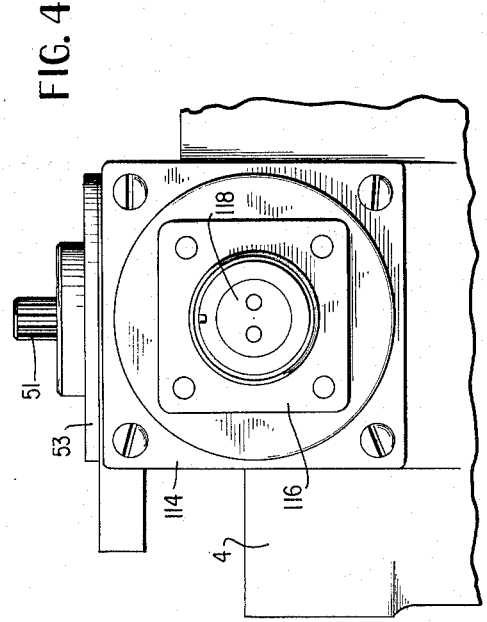
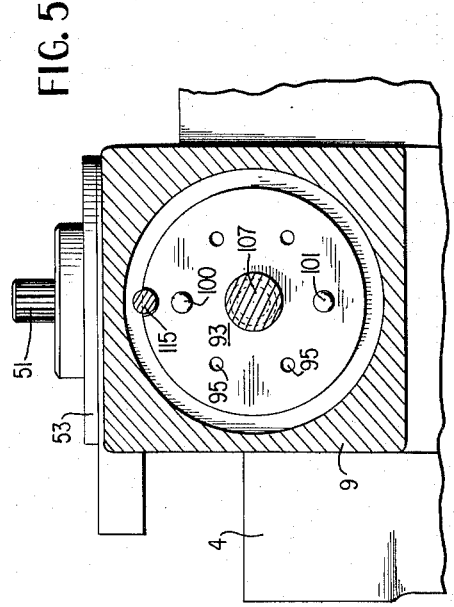
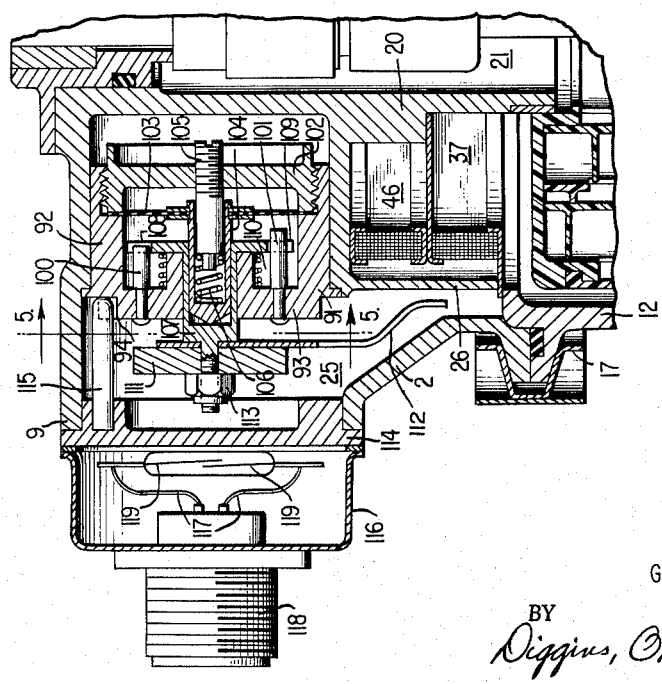
INVENTOR.
GEORGE T. DOWNEY
BY
Diggins, O'Boyle, & Harmon
ATTORNEYS

United States Patent Office 3,231,182
Patented Jan. 25, 1966

3,231,182
CENTRIFUGAL FLUID PURIFIER AND FILTER BYPASS INDICATOR COMBINATION
George T. Downey, Corry, Pa., assignor to Aero-Flow Dynamics, Inc., Corry, Pa., a corporation of New York
Filed June 28, 1963, Ser. No. 291,470
13 Claims. (Cl. 233—2)

The present invention relates in general to improvements in devices for removing foreign particles from fluids by the use of a combination of centrifugal force and a mechanical filter medium to insure complete purification of the fluids under all conditions of operation. Devices of the type contemplated are used, for example, in fuel systems and the like where the fuel must be freed from particles of foreign matter which would have a damaging effect on the apparatus within the system. The use of the present device, however, is not limited to incorporation within any specific system, but also finds utility in operations in which purification of the fluid alone is the desired end result.

The inventive aspects of the present invention also include the novel cooperation of a warning system to indicate the condition of an oncoming decrease in filter efficiency below a desired minimum. The device of the present invention is especially adapted for use in series with a fluid pressure or pumping means and acts as a fluid pressure booster and a purifier unit with a bypass being provided in cases of emergency or when it is desired to eliminate the purification step. The present invention is further designed to more effectively remove foreign particles from the fluid regardless of their density and specific gravity.

In prior art filtering devices of the character of the present invention, difficulty has been encountered in completely removing particles of low density such as lint or other fibers and also providing an effective filter which would perform with constant efficiency under conditions of severe mechanical shock. Other problems have also arisen in the nature of preventing collected contamination in the centrifugal apparatus from being swept into the stream of fluid, once the centrifuge becomes overloaded with contamination and during periods when the driven centrifuge is inoperative or bypassed by the fluid stream. Providing a feasible system of warning against oncoming contamination overloads in centrifugal purifiers also becomes a prime consideration since excess particles of contamination are usually dumped back into the fluid stream in the conventional centrifugal purifier without effecting the fluid pressure in the system with the only means of detecting overloads being that of periodic visual inspection of the centrifuge involving disassembly of the device.

This invention thus has for its primary object the presentation of novel and useful improvements in the efficiency and effectiveness of centrifugal fluid purifying devices.

Another object of the present invention is to provide a centrifugal fluid purifier with increased contaminate capacity by the provision of contamination traps within the centrifuge and by means of a novel cooperation with a mechanical filter medium.

A further object of the present invention is to provide a fluid purifier unit in which contamination from the filtering mediums will not be washed into the fluid stream during bypass conditions or under mechanical shock.

A further object of the present invention is to provide a device for simultaneously purifying a fluid and providing a pressure boost in the fluid line so as to function as a pump.

A further object of the present invention is the provision of an effective fluid pressure operated warning system for a centrifuge and filter combination.

A further object of the present invention is the provision of a multiple filter arrangement in combination with a centrifuge to allow warning before the purification apparatus becomes ineffective and complete bypass condition occurs.

A still further object of the present invention is to provide a clogged filter signal device which gives an electrical signal to obviate the need for periodic disassembly of the purification unit.

Yet another object of the present invention is to provide a purifier unit of the character described capable of removing particles of low density contamination by means of electrostatic forces to supplement the centrifugal forces and the mechanical filter mediums.

The means by which the foregoing objects and other advantages, which will be apparent to those skilled in the art, are accomplished, are set forth in the following specification and claims and are illustrated in the accompanying drawings dealing with a preferred embodiment. Reference is now made to the accompanying drawings in which:

FIG. 3 is a vertical cross sectional view taken along lines 3—3 of FIG. 2.

FIG. 4 is a side elevational view of the signal portion of the unit as shown in FIG. 3.

FIG. 5 is a cross sectional view taken along line 5—5 of FIG. 3.

Figures 1, 2:
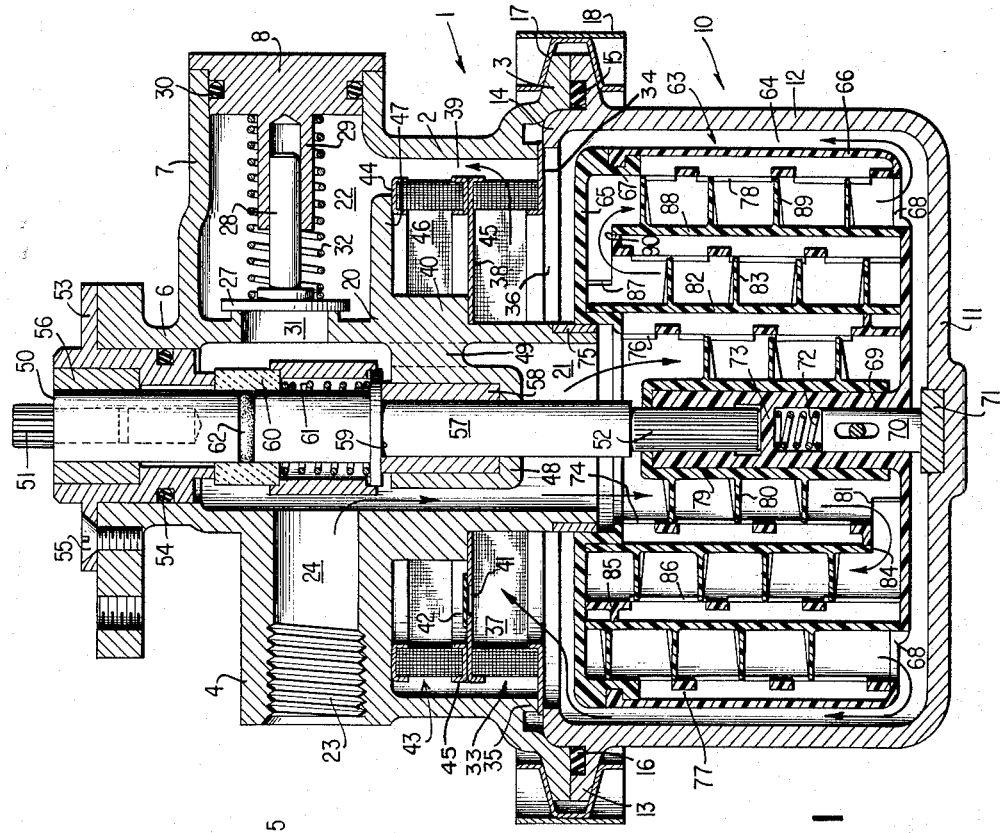
FIGURE 1 is a vertical cross section taken along lines 1—1 of FIG. 2, illustrating a centrifugal apparatus embodying the present invention.
FIG. 2 is a top plan view of the apparatus as shown in FIGURE 1.

Referring now to the drawings, wherein like reference numerals are used to indicate identical parts in the various views, a preferred embodiment of the invention, shown in FIGS. 1 to 5, is illustrated by way of example for a liquid fuel system and comprises a housing indicated generally at 1 which includes a cylindrical body portion 2 and an annular lip or flange 3. The body 2 of the housing is provided with an inlet fitting 4, an outlet fitting 5 and a cylindrical bearing housing 6. Also integral with the body 2 of the housing is a cylindrical portion 7 for the reception of a sealed plug 8 and an enlarged cylindrical portion 9 for housing a signal unit presently to be described.

The lower portion of the purifier unit comprises a cylindrical bowl 10 having a closed bottom 11, and a vertical wall 12. An annular lip 13 is located at the top of the wall 12 for engagement with the lip 3 and an inturned annular flange 14 extends above the lip 13. The lip 13 of the bowl is also provided with a continuous annular groove 15 for retention of a sealing ring 16 which provides a liquid pressure seal between the lip 3 of the housing 1 and the lip 13 of the bowl when the members are clamped together in any well known manner. The preferable means for clamping the housing and the bowl together is illustrated in FIGS. 1, 2 and 3 and comprises an annular V band 17 which engages the lips 3 and 13 and which is pressured thereagainst by an adjustable pressure band 18. The pressure band 18 is provided with a screw clamp means 19 whereby the two halves of the purifier unit may be releasably sealed together in a well known manner.

Internally of the housing 2, a hollow cylindrical extension 20, formed integrally with the body of the housing 2, is provided. The entire upper housing 1 may be formed by a casting process and may be comprised of any light weight metal capable of being so formed and which is suitable for the requirements of the system within which the purifier is to be utilized. The internal cylindrical extension 20 divides the housing 2 and defines an inlet chamber 21 and an outlet chamber 22. The inlet fitting 4 is provided with suitable screw threads 23 located on the surface of a bore which defines the inlet passage 24 for connecting an inlet conduit directly to the chamber 21.

The passage 24 and the inlet chamber 21 are also directly connected to the chamber 25, FIG. 3, which surrounds the pressure sensitive signal device presently to be described. The chamber 25 of the signaling device is connected to the inlet chamber by means of a double walled construction which extends around the periphery of the housing 2 between the inlet fitting 4 and the signal housing 9. The wall of the housing 2 provides one of the walls of the passage while the internal wall 26, shown in FIG. 3, forms the other wall. By this arrangement, the pressure sensitive signaling device is at all times subjected to the inlet pressure existing in the passage 24 and the chamber 21.

The outlet chamber 22 is in the form of an annular space connected to the outlet fitting and passage 5, FIG. 2, and the cylindrical housing 7. Bypass valve 27 and stem 28 are located within the plug housing 7, with the plug 8 providing a telescoping guide member 29 for the stem 28. The plug 8, FIGURE 1, is mounted within an opening in the housing 7 and sealed thereto by means of an O-ring seal 30. The plug 8 may be fitted to the housing 7 by any suitable means such as screw threads, cap screws or the like. The valve 27 is spring-biased so as to maintain a bypass passage 31 closed during normal operations. The valve 27 is spring-biased by means of the helical compression spring 32 which surrounds the telescoping guide member 29 and the stem 28. As seen in FIGURE 1, the spring 32 seats against the plug 8 and the rear side of the valve 27 so as to maintain a constant pressure.

A primary filter 33, in the shape of an annular ring is mounted within the outlet chamber 22 and comprises a sheet metal support ring 34, the outside periphery of which is secured between the flange 14 of the bowl 10 and a shoulder 35 of the housing 2 when the housing and the bowl are clamped together in assembled relationship. The ring 34 has an annular filter medium 37 which is concentric with the cylindrical extension 20, and which is retained in position by a lip 36 on ring 34.

A second sheet metal ring 38, having a down turned edge 39, engages the top edge of the filter medium 37 and a shoulder portion 40 of the cylindrical extension 20. The ring 38 includes a passage or opening 41 in the body thereof which is covered by a flexible reed valve 42. The reed valve 42 acts as a check valve so as to admit fluid flow from the underside of the ring in an upward direction for a purpose to be explained. The filter medium 37 may be of any desired quality or filtering capacity depending upon the design in any particular purifier unit.

The peripheral portion of the ring 38 provides a support for a secondary filter member 43 located on the top side thereof, comprising upper and lower channel shaped members 44 and 45 respectively, which engage the upper and lower edges of a second filter medium 46. The secondary filter 43 abuts the lower surface of an extension 47 of the cylindrical extension 20. In practice, the primary and secondary filter means may be independent filter structures or the entire assembly of the primary and secondary filters may be produced as a unit to be inserted within the outlet passage 22 and clamped in place by the engagement between the housing 2 and the bowl 10. With this arrangement, any fluid passing from the inlet chamber 21 to the outlet chamber 22 must necessarily pass through either the primary or the secondary filter members.

To complete the integral construction of the body of the housing 2, a bearing retainer 48 is located within the inlet chamber 21 and connected to the cylindrical extension 20 by means of webs 49. The purpose of the bearing support 48 will be presently described.

A drive shaft 50 is mounted axially within the cylindrical member 20 and extends downwardly and into the bowl 10 for drivingly engaging a centrifuge element. The drive shaft 50 includes a splined portion 51 for connection with a suitable drive means and a second splined end portion 52 for connection with the centrifuge unit. A bearing retention ring 53 is received in the bearing housing 6 and sealed therewith by means of O-ring seal 54. The bearing retention ring 53 may be secured to the top flange of the bearing housing 6 by means of screw fasteners 55.

An outboard bearing member 56 is received within the bearing retention ring to provide rotational support for the drive shaft 50. A reduced diameter portion 57 of the drive shaft 50 extends through the bearing support 48 and is provided with rotational support by means of an inboard bearing 58. A flat annular flange 59 on the drive shaft 50 limits the axial movement of the drive shaft in a downward direction when it is placed within the cylindrical extension 20.

In order to seal the drive shaft 50 within the inlet passage 21, a ceramic sealing ring 60 surrounds the shaft 50 and bears against the bottom edge of the bearing retention ring 53 on its top edge, and against a helical compression spring 61 on its bottom edge. The spring 61 maintains a constant bias on the drive shaft 50 in a downward direction by means of a seating engagement with the annular flange 59. The ceramic sealing ring 60 is sealed with respect to the drive shaft 50 by means of an O-ring seal 62.

The centrifuge element indicated generally at 63 is mounted for free rotation within the cavity 64 formed by the bowl member 10. The centrifuge element 63 comprises a top cover element 65 and a cup shaped member 66 which is secured to the cover element 65 by means of a tongue and groove arrangement 67. The cup member 66 is provided with outlet openings 58 in the bottom thereof to allow fluid to pass from the centrifuge element into the cavity 64 and from thence to the primary filter 33 in the outlet chamber 22.

The cup member 66 is also provided with an upstanding hollow core 69 which is in driving engagement with the splined end 52 of the drive shaft 50. The cup portion 66 of the centrifuge is supported within the cavity 64 by means of the plunger 70 which rests on a suitable ware surface element 71 located in the bottom 11 of the bowl 10. A compression spring 72 seats against the top of the plunger 70 and against a barrier 73 within the hollow core 69. A pin and slot connection between the plunger 70 and the core 69 prevents relative rotation therebetween while allowing telescoping motion between the two parts. With this arrangement, the cup member 66 is constantly urged upwardly into engagement with the drive shaft 50.

The cover member 65 of the centrifuge element has a circular opening in the top surface thereof defined by a downwardly extending cylindrical wall 74 which is concentric with the core element 69 when the centrifuge is assembled. The surface of the wall 74 at the top rim of the opening provides a bearing surface for the centrifuge element in cooperation with a nylon bearing or the like 75 on the terminal end of the cylindrical member 20 of the housing 2. Since the centrifuge element acts as a pump when in operation under normal conditions, the pressure on the inlet side of this bearing engagement will be less than the pressure in the cavity 64 downstream of the centrifuge element. Any leakage past the bearing engagement between the wall 74 and the nylon ring 75 will be minimal and will have no effect on the operation of the device. The wall 74 of the cover 65 is also provided with openings 76 spaced around the surface thereof for a purpose to be described.

On the outside periphery of the cover member 65, the cover member extends downwardly past the tongue and groove engagement 67 to form a cylindrical wall 77 which terminates at the bottom of the cup member 66 adjacent the inside peripheral edge thereof. The wall 77, like the wall 74, includes a multiplicity of openings 78 in the surface thereof, for communication with an annular contamination trap defined by the spaced wall of the cup 66 and the wall 77.

A sleeve member 79, having a helical screw 80 formed on the outside surface thereof, surrounds the core element 69 and is keyed for rotation therewith. The outside edge of the screw member 80 may be keyed in any suitable fashion to the openings 76 in the cylindrical wall 74 so as to perfect a driving relation between the core element 69, the sleeve 79 and the cover member 65. It is also noted that the cylindrical wall 74 has an opening 81 at its bottom extremity to allow for the flow of fluid from the space defined by the wall 74 to the remaining part of the centrifuge element.

Concentric with and spaced from the cylindrical wall 74 is a cylinder 82 having a helical screw element 83 on its outside periphery with the direction of the incline of the screw member being opposite that of the screw member 80. The top portion of the cylinder 82 extends completely to the under surface of the cover 65 and the bottom portion of the cylinder extends completely to the bottom of the cup member 66. An opening 84 in the bottom edge of the cylinder 82 cooperates with the opening 81 to allow for the passage of fluid from the cylinder defined by the wall 74 and to the helical screw member 83.

Cylinder 85 surrounds the outside periphery of the screw 82 and may be keyed for rotation therewith in the manner previously described with relation to the screw member 80. The cylinder 85 extends from the cover 65 to the bottom of the cup 66 and includes spaced openings 86 located about its surface and an extended opening 87 adjacent its top edge to allow for fluid flow from the screw member 83 to the remaining portion of the centrifuge element.

Still another cylindrical element 88 is mounted within the centrifuge element and is spaced from the cylinder 85. The cylinder 88 includes a helical screw 89 on its outside periphery with the screw 89 being inclined in a direction opposite to the inclination of the screw 83. The cylinder 88 is provided with an elongated opening 90 which coincides with the opening 87 in the spaced wall 85 to permit the passage of fluid to the screw 89. The outside periphery of the screw 89 may also be keyed to the wall 77 of the cover 65.

It will thus be understood that all of the elements of the centrifuge including the cover member 65, the cup 63, the helical screw members and the spaced walls are keyed or otherwise secured to rotate as a unit when driven by the drive shaft 50. All of the elements comprising the centrifuge unit are constructed of nylon or any similar light-weight dielectric material for the purpose of creating an electrostatic charge on the surface thereof by means of the friction of the moving fluid. The electrostatic charge thus created attracts particles of low density contamination such as cotton lint, road dust and iron oxide particles commonly found in motor fuels. With the alternate reversing of the successive screw flights, the fluid will be drawn from the inlet passage 20 downwardly through the chamber defined by the wall 74, upwardly between the cylinders 82 and 85 and then downwardly between the cylinder 88 and the wall 77 according to the direction of the arrows in FIGURE 1.

As before mentioned, the clogged filter signaling device shown in FIG. 3 is located in the body of the housing 2 and is exposed to the fluid pressure in the chamber 25 which is directly connected to the inlet chamber 21 and the inlet passage 24. A mounting assembly 91 is received in a suitable recess in the walls of the housing 2 and comprises an annular wall member 92 which may be secured by any suitable means to the recess in the walls of the housing 2 so as to prevent relative movement therebetween. The mounting assembly further includes a front closure plate 93 having an indexing notch 94 in the surface thereof. The closure plate 93 also includes spaced passages 95, shown in FIG. 5, about its surface. The passages 95 permit flow of fluid from the chamber 25 to the internal area of the mounting assembly defined by the annular wall 92 and the closure plate 93. The closure plate 93 also includes stop pins 100 and 101 which pass through the body thereof.

A screw threaded plug 102 engages the annular wall 92 in such a manner as to secure the peripheral edge of a diaphram 103 therebetween. The diaphram is connected to a slidable hollow pin 104 which slidably engages an adjustable guide and stop pin 105. The pin 105 is received by the plug 102 and its position may be adjusted by means of a screw threaded engagement with the plug 102. A compression spring 106 acts between the stop pin 105 and the slidable member 104 so as to maintain the diaphram 103 in an unflexed condition such as shown in FIG. 3.

The slidable pin 104 telescopes within a tubular guide 107 received in a suitable opening in the closure plate 93. The tubular guide member 107 is also rotatable with respect to the closure plate 93 and has laterally extending projections 108 and 109 which engage stop pins 100 and 101 respectively. As seen clearly in FIG. 3, the stop pin 101 extends a greater distance to the right than the stop pin 100 with the pin 101 extending to the right past the position of the projection 109. A torsion spring 110 is connected between the closure plate 93 and the projections on the tubular guide 107. The torsion spring 110 tends to rotate the member 107 in a counter-clockwise direction as viewed from the right in FIG. 3 when the member 107 is moved to the right to disengage the projection 108 from the stop pin 100.

On the left end of the tubular member 107 as shown in FIG. 3, a bar magnet 111 and a manual reset arm 112 are clamped in rigid relationship with the member 107 by means of the lock nut 113.

A cover plate 114 provides a closure for the signal housing 9 and carries an indexing pin 115 which cooperates with the notch 94 in the closure plate 93 to insure proper positioning of the cover member 114. An electrical contact housing 116 is secured to the cover plate 114 and houses electrical leads 117 and an electrical connector 118 suitable for connection to an electrical alarm system or visual indicating device, not shown. Each of the leads 117 has a polarized spring leaf contact 119 for making and breaking an electrical circuit.

When the signalling device is in an unactuated condition as shown in FIG. 3, the poles of the bar magnet 111 are so positioned as to permit the polarized contacts 119 to normally remain out of contact with the electrical circuit being open. When the bar magnet 111 is caused to rotate in a manner presently to be described, the leaf contacts 119 will be magnetized and brought into electrical contact to close the signal circuit.

*Operation*

In operation, the purifier unit is connected in a fluid pressure line, such as a fuel line or the like, with an inlet conduit being connected by, means of the threaded portion 23, to the inlet conduit 24 and an outlet conduit being connected to the outlet fitting and conduit 5. During normal operation, the drive shaft 50 is driven by any suitable means such as an electric motor or the like so as to rotate the centrifuge element 63 to act as a pressure booster to the fluid admitted to the inlet chamber 21. The fluid enters chamber 21 and is impelled downwardly, as shown by the arrows in FIGURE 1, by the helical screw 80. The fluid passes through the openings 81 and 84 and is then impelled upwardly by the helical screw 83 and passes through the openings 87 and 90 to the outer chamber containing the helical screw 89. As shown by the arrows in FIGURE 1, the liquid is directed downwardly by the screw member 89 and passes out of the centrifuge element 63 through the openings 68 and into the cavity 64 of the bowl 12.

The flow path of the liquid continues upwardly around the centrifuge element and the fluid is passed through the filter medium 37 and into the outlet chamber 22 and from thence through the outlet fitting 5 to the system for which it is to be utilized.

As the fluid passes through the tortuous path provided by the centrifuge element 63, particles of contamination are removed from the fluid stream by means of centrifugal force and travel radially with respect to the concentric cylindrical chambers, and are collected on the surface of the walls of the cylinders 82, 88 and 66. The particles of contamination are allowed to pass through the openings in the walls 74, 86 and 77 and are trapped between the spaced walls of the various cylinders so as to be completely removed from the liquid stream.

In addition to the removal of particles of contamination by means of centrifugal force, less dense particles such as lint fibers and the like are also collected on the various walls of the centrifugal element 63 by virtue of the fact that the centrifuge element is constructed of nylon or a like dielectric material. The friction created by the relative movement between the liquid stream and the walls of the centrifuge creates an electrostatic charge thereby attracting these low density particles in a well known manner. During regular operation of the unit, substantially all of the particles of contamination will be removed from the fluid stream by the centrifuge element and whatever particles of contamination remain will be collected by the filter medium 37.

The distinct combination of the filter medium 37 and the centrifuge unit provides a constant efficiency for the purification operation. In the event that the purifier unit is utilized in a motor vehicle, machinery subjected to constant vibration forces or under any other conditions involving mechanical shock or the inversion of the entire unit, it has been experienced that even with the provision of contamination traps such as utilized in the present invention, a certain amount of particles of contamination will be shaken loose from the walls of the chambers and from the walls of the various concentric cylinders so as to be dumped back into the fluid stream. Under some conditions of operation, it has been extremely difficult to prevent this type of recontamination of the liquid in devices relying solely upon the centrifugal purifier unit. In the present device, the placement of the filter medium 37 in the flow path on the downstream side of the centrifuge element eliminates this hazard and any particles thrown back into the fluid stream are removed by the filter medium 37 thus maintaining the efficiency of the purifying operation. It is thus seen that the filter medium provided by the present invention has a novel functional cooperation with the centrifuge element.

In prior art devices, the experience has been that the centrifuge element must necessarily be disassembled periodically as determined by hours of operation or spot checking to determine the degree of contamination loading in the centrifuge element. In the present device, additional capacity is given to the overall device by the utilization of the primary filter medium 37 and the necessity for periodic checks has been eliminated. In the event that the centrifuge element becomes overloaded so that substantially all or a part of the contamination within the liquid is passed to the filter medium 37, the filter medium will eventually become clogged so as to present an impedance to the flow of liquid from the bowl 10 to the outlet chamber 22. In this event, the fluid pressure within the cavity 64 will increase sufficiently to open the flexible reed valve 42 to permit the liquid to maintain a parallel flow path through the secondary filter medium 46. When the fluid pressure becomes sufficient to open the valve 42, the impedance to the fluid flow will also cause a back pressure resulting in an overall rise in the pressure within the inlet chamber 21 and the inlet passage 24. As previously explained, the chamber 25 surrounding the signal device shown in FIG. 3 is subjected to the fluid pressure within the chamber 21. By means of the passages 95 and the closure plate 93, the fluid pressure in the chamber 25 will also act on the diaphragm 103 to create an unbalance and to flex the diaphragm to the right as viewed in FIG. 3. The diaphragm 103, under these conditions, functions to move the slidable pin 104 to the right allowing the tubular guide 107 to be moved to the right under the action of the compressed torsion spring 110. When this occurs, the projection 108 is disengaged from stop pin 100 and the torsion spring rotates the tubular guide 107 thereby repositioning the poles of the bar magnet 111. The projection 108 will engage against pin 101 after a rotation of approximately 180 degrees of the guide 107. With the influence of the bar magnet 111 being applied by the rotation of the tubular member 107, the contacts 119 of the electrical leads 117 snap together to complete the electrical circuit to actuate a signaling device such as a signal light or an audible signal. The operator is thereby warned of the clogged condition of the primary filter 37 and the contamination overload in the centrifuge element. This warning occurs before the filtering efficiency of the unit is disturbed since the secondary filter medium 46 is now placed in the liquid stream.

In the event that the secondary filter becomes sufficiently clogged to impede the flow of fluid to the outlet conduit, or in the event that the centrifuge is deenergized, the fluid pressure within the chamber 21 will rise sufficiently to open the direct bypass valve 27 by compressing the spring 32. Under bypass conditions, the signaling device, if not already actuated, will be actuated and act also as an indication that fluid is being bypassed directly to the fuel system without filtering.

When it is desired to reset the signaling device after the filters have been replaced and the centrifuge cleaned, the cover 114 is removed and the tubular guide 107 is depressed manually, rotated by means of lever 112, and released to reset the mechanism to the condition shown in FIG. 3 with the bar magnet 111 in position to permit the electrical contacts 119 to separate. The indexing pin 115 provides a foolproof method of insuring that the cover 114 is properly oriented so that the contacts 119 remain separated and uninfluenced by the bar magnet 111. The pin 101 cooperates with the projection 109 in the rotation of guide 107 during reset to act as a positive stop and correctly position the bar magnet. The purifier unit is then ready for use.

It will be readily apparent to those skilled in the art that the present invention provides novel and useful improvements in centrifugal fluid purifier devices of the character described. The arrangement and types of structural components contained within the invention as well as the mode of utilizing the invention may be subjected to numerous modifications well within the purview of this invention and applicant intends only to be limited to a liberal interpretation of the specification and the appended claims.

Having thus described the invention, what is claimed as new and desired to be secured by Letters Patent is:

1. A fluid purifier combination comprising; a housing, said housing including an inlet chamber and an outlet chamber, a centrifuge bowl connected to said housing, a centrifuge element rotatably mounted within said bowl, means mounted in said housing and said bowl to rotate said centrifuge element, said inlet chamber communicating directly with said centrifuge element and said bowl communicating with said outlet chamber, a primary filter medium and a secondary filter medium positioned between said bowl and said outlet chamber in parallel flow relationship, fluid pressure actuated valve means between said filter mediums operable to permit parallel fluid flow therethrough only at a first predetermined fluid pressure in said bowl, fluid pressure actuated bypass valve means between said inlet and said outlet chambers operable at a second predetermined fluid pressure in said inlet chamber above said first predetermined fluid pressure to connect said inlet chamber directly to said outlet chamber, and fluid pressure responsive signal means for actuating an electrical signal at a fluid pressure in said inlet chamber equal to said first fluid pressure.

2. A fluid purifier combination comprising; a housing including an inlet chamber and an outlet chamber, a centrifuge bowl connected to said housing, a centrifuge element mounted within said bowl, said inlet chamber communicating with said centrifuge element and said bowl communicating with said outlet chamber, a primary filter and a secondary filter positioned between said bowl and said outlet chamber in parallel flow relationship, fluid pressure responsive valve means between said filters operable to permit parallel fluid flow therethrough only at a first predetermined fluid pressure in said bowl, fluid pressure responsive bypass valve means between said inlet and said outlet chambers operable at a second predetermined fluid pressure in said inlet chamber above said first predetermined fluid pressure to connect said inlet chamber directly to said outlet chamber, and fluid pressure responsive signal means operable upon opening of said valve means between said filters, whereby a warning is given when said primary filter becomes clogged but before said bypass valve opens.

3. The combination according to claim 2 wherein said centrifuge element is rotatably mounted in said bowl, means in said housing and said bowl for rotating said centrifuge element, said centrifuge element comprising a series of concentric cylinders to provide a tortuous path for the fluid therein, helical screw means within said cylinders for impelling the fluid, and contamination traps between the walls of said cylinders for retaining particles of contamination out of the stream of fluid within said cylinders.

4. The combination according to claim 3 wherein said centrifuge element is composed entirely of a dielectrical material, whereby the friction created by the fluid moving therethrough will induce an electrostatic charge on the surface thereof.

5. The combination according to claim 2 wherein said inlet chamber comprises a central cylindrical chamber, said bowl and said outlet chambers comprise cylindrical chambers surrounding said inlet chamber, said outlet chamber being located above said bowl, and said filter units being superimposed one above the other and in the flow path between said bowl and said outlet chamber, whereby the fluid passing from said bowl passes upwardly through said filter to said outlet chamber.

6. The combination according to claim 2 wherein said fluid pressure responsive signal means comprises; a pressure responsive movable member exposed to the fluid pressure in said inlet chamber, and means to convert the movement of said member to an electrical signal.

7. In a fluid purifier having an inlet and an outlet chamber, centrifuge means between said chambers, primary and secondary filter mediums located downstream of said element, and pressure responsive valve means to allow parallel fluid flow through said filters only upon a clogged condition in said primary filter, a clogged filter indicating device comprising; a fluid pressure responsive movable member exposed to the fluid pressure in said inlet chamber, and means to convert the movement of said member to an electrical signal, whereby a signal will be given when said primary filter becomes clogged so as to raise the overall fluid pressure in said inlet chamber.

8. A fluid purifier comprising in combination, an inlet chamber, a centrifuge connected to said inlet chamber, a first filter unit located downstream of said centrifuge, a second filter unit, fluid pressure responsive valve means to place said filter units in parallel flow relationship only upon a rise in pressure caused by clogging of said first filter, and fluid pressure responsive signal means conditioned for actuation upon opening of said valve.

9. In a fluid purifier having a housing including an inlet chamber and a filter medium, a clogged filter signal device comprising; a diaphragm mounted in said housing and subjected to the fluid pressure in said inlet chamber, a contact pin connected to said diaphragm to be moved thereby, a slidable tubular member in telescoping engagement with said pin, biasing means for maintaining said pin in a first position in abutment with said tubular member, a compressible torsion spring acting against said tubular member to balance the bias of said biasing means, said tubular member being mounted for rotation in said housing and connected to said torsion spring to be rotated thereby, stop means mounted on said housing to hold said tubular member in one position of rotation, a bar magnet fixed to the end of said tubular member remote from said pin, an electrical alarm circuit having polarized spring leaf contact members, said leaf contacts being positioned out of mutual contact whereby an increase in fluid pressure in said inlet chamber acts to move said diaphragm to permit said torsion spring to slide said tubular member out of contact with said stops and to rotate said member to a second position to displace the poles of said magnet, thereby causing the leaf contacts to engage and complete the electrical alarm circuit.

10. An alarm device for a filter comprising in combination; a fluid pressure responsive diaphragm means subjected to fluid pressure upstream from said filter and movable thereby, a rotatable member having a bar magnet thereon, an electrical alarm circuit having polarized spring leaf contact members, said lead contacts being positioned out of mutual contact, means for converting the movement of said diaphragm to rotate said member to displace the poles of said magnet, whereby the leaf contacts are caused to engage upon a predetermined rise in fluid pressure due to clogging of said filter.

11. A fluid purifier comprising; a rotatable centrifuge unit including a series of concentric cylinders, means providing a counter-directional fluid flow path between said cylinders, helical screw means within said cylinders for impelling the fluid in said cylinders, contamination traps between the walls of said cylinder for retaining particles of contamination out of the stream of fluid within said cylinders, and means for rotating said centrifuge.

12. The combination according to claim 11 wherein said centrifuge unit is composed entirely of a dielectric material, whereby the friction created by the fluid moving therethrough will induce an electrostatic charge on the surface thereof.

13. A fluid purifier combination comprising; a centrifuge element, means within said element for providing a counter-directional flow path, impeller means within said centrifuge for conveying liquid therethrough, contamination traps within said element for collecting particles of contamination out of said flow path, a filter medium located downstream from said centrifuge element, and fluid pressure responsive signal means for initiating a signal upon an increase in fluid pressure within said purifier occasioned by clogging of said filter.

References Cited by the Examiner

UNITED STATES PATENTS

| | | | |
|---|---|---|---|
| 1,050,622 | 1/1913 | Raasloff et al. | 233—2 |
| 2,220,706 | 11/1940 | Cantin | 210—132 |
| 2,617,535 | 11/1952 | Hamilton | 210—132 |
| 2,729,339 | 1/1956 | McCoy | 210—90 |
| 3,029,836 | 4/1962 | Gruner | 137—557 |
| 3,077,854 | 2/1963 | Pall | 116—70 |

M. CARY NELSON, *Primary Examiner.*